US008576748B2

(12) United States Patent
Sakamoto et al.

(10) Patent No.: US 8,576,748 B2
(45) Date of Patent: Nov. 5, 2013

(54) WIRELESS COMMUNICATION TERMINAL AND CONNECTION SETUP METHOD OF WIRELESS NETWORK

(75) Inventors: Akihiko Sakamoto, Tokyo (JP); Hitoshi Tsuchiya, Tokyo (JP); Kazuyuki Shibuya, Sagamihara (JP)

(73) Assignee: Olympus Corporation, Tokyo (JP)

( * ) Notice: Subject to any disclaimer, the term of this patent is extended or adjusted under 35 U.S.C. 154(b) by 435 days.

(21) Appl. No.: 12/756,499

(22) Filed: Apr. 8, 2010

(65) Prior Publication Data

US 2010/0260069 A1 Oct. 14, 2010

(30) Foreign Application Priority Data

Apr. 14, 2009 (JP) ................................. 2009-098001

(51) Int. Cl.
*H04L 12/28* (2006.01)

(52) U.S. Cl.
USPC .......................................... 370/256; 370/255

(58) Field of Classification Search
None
See application file for complete search history.

(56) References Cited

U.S. PATENT DOCUMENTS

| | | | | |
|---|---|---|---|---|
| 7,363,032 B2 * | 4/2008 | Phillips et al. | ............. | 455/422.1 |
| 7,715,853 B1 * | 5/2010 | Frerking et al. | ............. | 455/456.4 |
| 7,738,411 B2 * | 6/2010 | Koponen et al. | ............. | 370/315 |
| 7,788,680 B2 * | 8/2010 | Vazeille et al. | ............. | 719/318 |
| 7,916,663 B2 * | 3/2011 | Yee | ................. | 370/254 |
| 7,948,925 B2 * | 5/2011 | Miyabayashi et al. | ........ | 370/302 |
| 8,185,049 B2 * | 5/2012 | Zhang et al. | ................. | 455/41.2 |
| 8,204,496 B2 * | 6/2012 | Shinoda | ......................... | 455/423 |
| 8,380,982 B2 * | 2/2013 | Miyabayashi et al. | ........ | 713/156 |
| 8,396,497 B2 * | 3/2013 | Nakajima | ...................... | 455/507 |
| 2003/0126243 A1 * | 7/2003 | Kudo et al. | .................... | 709/222 |
| 2005/0092143 A1 * | 5/2005 | Lehnert et al. | .................. | 81/469 |
| 2006/0235905 A1 * | 10/2006 | Kapur | ........................... | 707/202 |
| 2006/0240824 A1 * | 10/2006 | Henderson et al. | ........ | 455/435.1 |

(Continued)

FOREIGN PATENT DOCUMENTS

| | | |
|---|---|---|
| JP | 2005-347911 A | 12/2005 |
| JP | 2006-254077 A | 9/2006 |
| JP | 2008-283422 A | 11/2008 |

OTHER PUBLICATIONS

Part 11: Wireless LAN MAC and PHY Specifications, IEEE Std. 802.11-2007 (Extract of descriptions about Infrastructure Mode) (http://standards.ieee.org/getieee802/douwnload/802.11-2007.pdf).

(Continued)

*Primary Examiner* — Ayaz Sheikh
*Assistant Examiner* — Faiyazkhan Ghafoerkhan
(74) *Attorney, Agent, or Firm* — Westerman, Hattori, Daniels & Adrian, LLP (57) ABSTRACT

A wireless communication terminal comprises a trigger receiving unit, a participation request receiving unit, and a connection setup unit. The trigger receiving unit receives a predetermined trigger. The participation request receiving unit receives requests to participate in a wireless network from an external terminal which does not participate in the wireless network in which the wireless communication terminal has participated, using wireless communication. The connection setup unit makes each of participation requests received by the participation request receiving unit from a plurality of external terminals correspond to one trigger received by the trigger receiving unit. The connection setup unit performs a connection setup which makes each of the plurality of external terminals participate in the wireless network in response to each of the participation requests, in the order in which the participation requests are received.

7 Claims, 11 Drawing Sheets

(56) References Cited

U.S. PATENT DOCUMENTS

| | | | |
|---|---|---|---|
| 2006/0250988 A1* | 11/2006 | Garcia et al. | 370/260 |
| 2007/0001887 A1* | 1/2007 | Johnstone et al. | 341/155 |
| 2007/0083470 A1* | 4/2007 | Bonner et al. | 705/51 |
| 2007/0157281 A1* | 7/2007 | Ellis et al. | 725/134 |
| 2008/0037444 A1* | 2/2008 | Chhabra | 370/254 |
| 2008/0089300 A1* | 4/2008 | Yee | 370/338 |
| 2008/0168545 A1* | 7/2008 | Inoue et al. | 726/6 |
| 2009/0222659 A1* | 9/2009 | Miyabayashi et al. | 713/156 |
| 2010/0035602 A1* | 2/2010 | Doherty et al. | 455/425 |
| 2010/0254314 A1* | 10/2010 | Tsuchiya | 370/328 |
| 2010/0291954 A1* | 11/2010 | Nakajima | 455/507 |

OTHER PUBLICATIONS

Japanese Office Action dated Jan. 8, 2013, issued in corresponding Japanese Patent Application No. 2009-098001, w/ English translation.

* cited by examiner

| SSID | SET PARAMETER |
|---|---|
| WLAN1 | AAAAAAAA |
| WLNA2 | BBBBBBBB |
| WLAN3 | CCCCCCCC |
| ... | ... |

WIRELESS COMMUNICATION TERMINAL AND CONNECTION SETUP METHOD OF WIRELESS NETWORK

BACKGROUND OF THE INVENTION

1. Field of the Invention

The present invention relates to a wireless communication terminal and a connection setup method of a wireless network capable of facilitating the connection of a wireless communication terminal to a wireless network.

Priority is claimed on Japanese Patent Application No. 2009-098001, filed Apr. 14, 2009, the content of which is incorporated herein by reference.

2. Description of Related Art

In the related art, a communication terminal with a wireless LAN function needs to perform a wireless connection or a security setup in order to participate in the network (infrastructure network) provided by an access point (hereinafter, referred to as an AP), and various settings need to be input to the communication terminal in order to participate in the network. Since the setting and input operation is complicated, in particular, it is difficult for the user who is unskilled in wireless LAN techniques to perform the connection setup.

In order to solve the above-mentioned problem, Wi-Fi Protected Setup™ Specification 1.0 (hereinafter, referred to as WPS) has been proposed as a wireless LAN standard technique for simply performing wireless connection or security setup and making a communication terminal participate in an infrastructure network.

In the WPS, in an external terminal that has a wireless LAN function and wants to participate in a network and a communication terminal that has already participated in the network and has a function of enabling the external terminal to participate in the network, the user can push an actual button, or a button on the screen using a GUI function (graphical user interface function) to perform a setup operation. For example, a document IEEE Std. 802.11™-2007 discloses a communication method in the infrastructure mode in which communication is performed through an infrastructure network.

SUMMARY OF THE INVENTION

In one aspect of the present invention, there is provided a wireless communication terminal that includes at least: a trigger receiving unit which receives a predetermined trigger; a participation request receiving unit which receives requests to participate in a wireless network from an external terminal which does not participate in the wireless network in which the wireless communication terminal has participated, using wireless communication; and a connection setup unit which makes each of participation requests received by the participation request receiving unit from a plurality of external terminals correspond to one trigger received by the trigger receiving unit, and performs a connection setup which makes each of the plurality of external terminals participate in the wireless network in response to each of the participation requests, in the order in which the participation requests are received.

Preferably, the connection setup unit may perform the connection setup on one of the plurality of external terminals and may receive the participation request from another terminal among the plurality of external terminals.

Preferably, the trigger received by the trigger receiving unit may be a trigger which is generated when the wireless communication terminal is started.

Preferably, the above wireless communication terminal may further comprise an instruction input unit which receives a predetermined instruction from a user, and the trigger received by the trigger receiving unit may be a trigger which is generated based on the predetermined instruction received by the instruction input unit.

Preferably, the wireless communication terminal may further comprise a memory unit which stores contents of the connection setup; and a determining unit which determines whether the wireless communication terminal is separated from the wireless network in which the wireless communication terminal has participated, and the wireless communication terminal may be separated from the wireless network based on a determination result of the determining unit.

Preferably, the connection setup unit may perform the connection setup based on the contents of the connection setup stored in the memory unit, after the wireless communication terminal is separated from the wireless network.

Moreover, in another aspect of the present invention, there is provided a connection setup method of wireless network, that includes at least: receiving a predetermined trigger; receiving requests to participate in a wireless network from a plurality of external terminals which does not participate in the wireless network in which a wireless communication terminal has participated, using wireless communication; storing in a memory unit participation request information related to participation requests received from the plurality of external terminals within a predetermined period including the time when the trigger is received; and performing a connection setup which makes each of the plurality of external terminals, whose participation requests are received within the predetermined period, participate in the wireless network, in the order in which the participation requests are received, based on the participation request information stored in the memory unit.

BRIEF DESCRIPTION OF THE DRAWINGS

The above features and advantages of the present invention will be more apparent from the following detailed description of certain preferred embodiments taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, embodiments of the present invention will be described with reference to the drawings.

First Embodiment

Figure 1A:
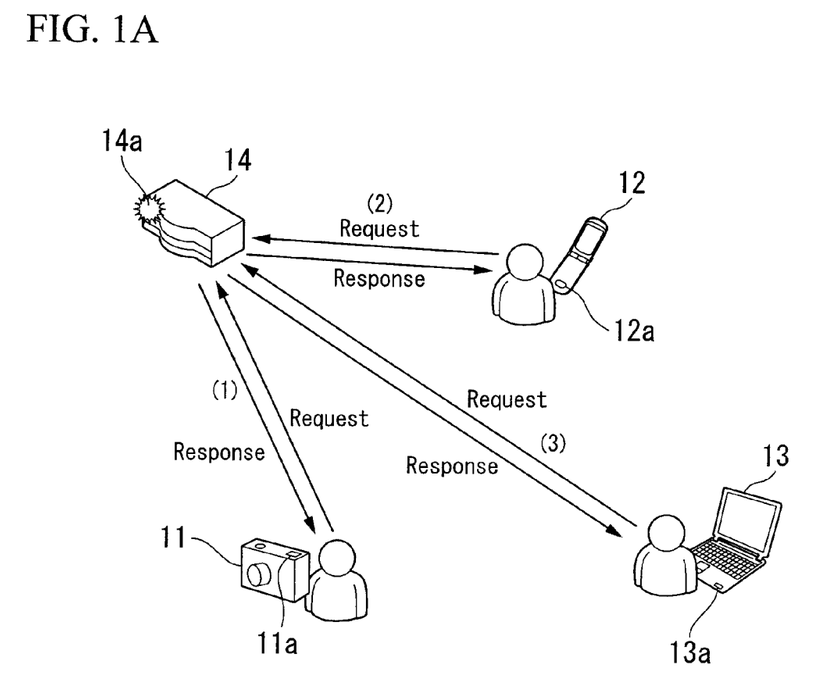
FIGS. 1A and 1B are diagrams illustrating examples in which a wireless communication terminal according to a first embodiment constructs a wireless network.
Figure 1B:
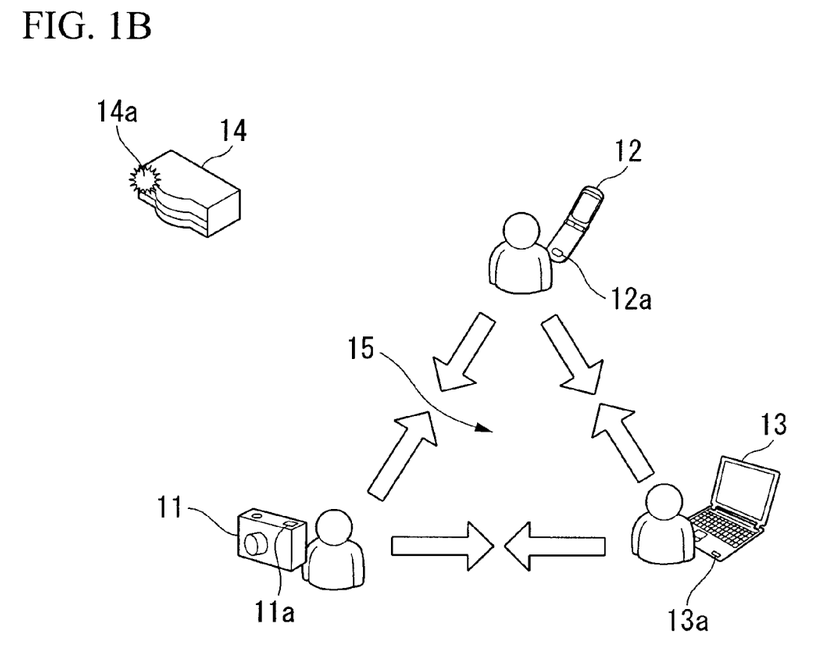

First, a first embodiment of the present invention will be described. FIGS. 1A and 1B show examples in which a wireless network generating terminal 14 (wireless communication terminal) is used to construct a wireless network in the ad hoc mode.

The wireless network generating terminal 14 serves as an authentication terminal (referred to as a registrar) that receives a request to participate in the wireless network. When an LED 14a provided in the wireless network generating terminal 14 is turned on, the wireless network generating terminal 14 receives the request to participate in the wireless network.

A network camera 11, a cellular phone 12, and a laptop 13 are communication terminals (referred to as enrollees) that transmit a request to participate in the wireless network, and include connection setup switches 11a, 12a, and 13a for connection setup, respectively. When the user pushes the connection setup switches 11a, 12a, and 13a, each of the communication terminals transmits a request (participation request) to the wireless network generating terminal 14, which is a registrar, and receives a response to the wireless network generating terminal 14. In this way, the connection of the wireless network is set, the details of which will be described below.

In the example shown in FIG. 1A, the network camera 11, the cellular phone 12, and the laptop 13 transmit requests in this order. In this way, connection setup to the communication terminals is sequentially done. In the example shown in FIG. 1B, the connection setup of each communication terminal ends and a wireless network 15 is constructed by the network camera 11, the cellular phone 12, and the laptop 13 in the ad hoc mode.

Figure 2:
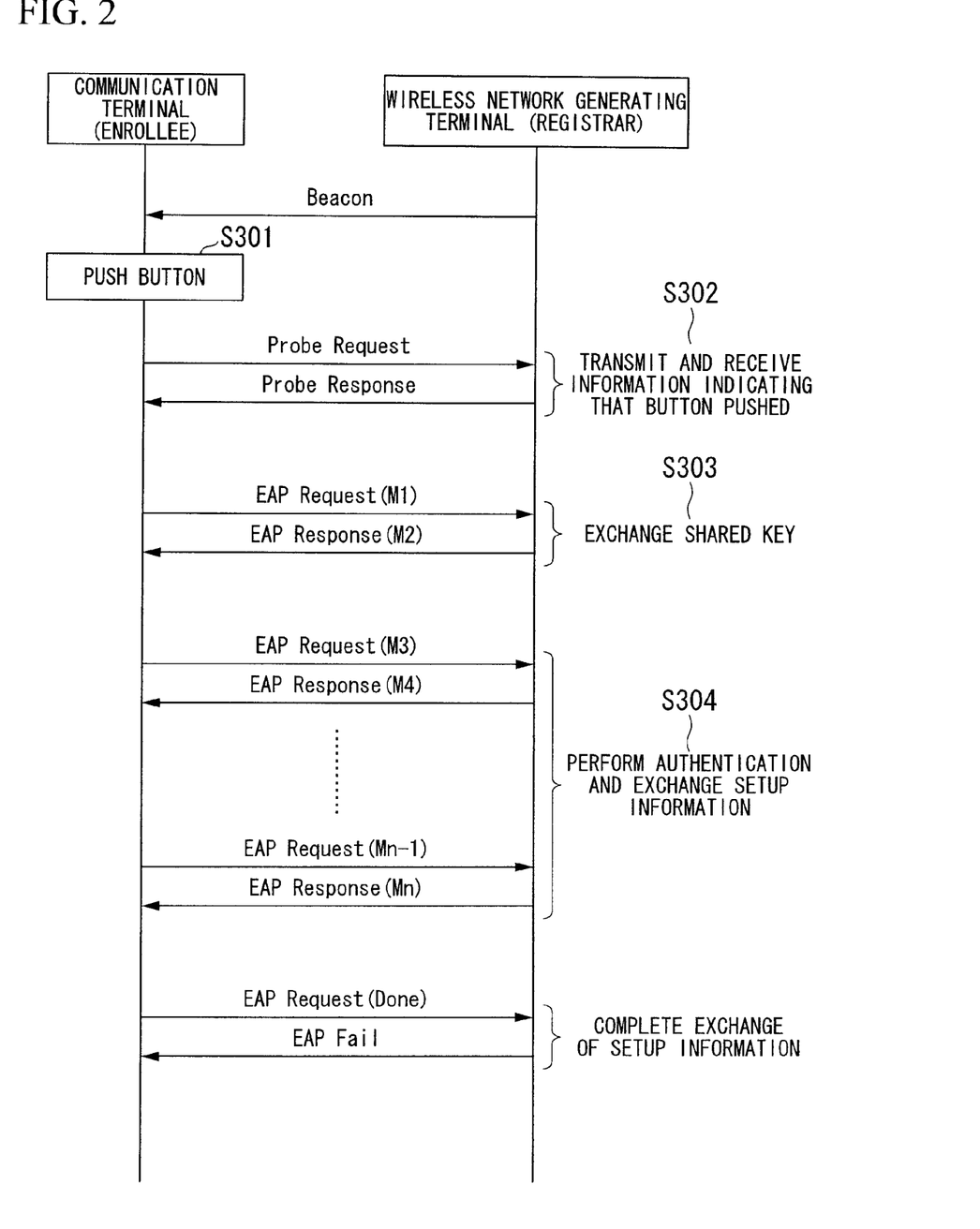
FIG. 2 is a sequence diagram illustrating a connection setup process between wireless communication terminals according to the first embodiment.

Next, PBC and PIN code input, which is a connection setup method used in WPS, will be described. FIG. 2 is a diagram illustrating communication between a registrar and an enrollee when connection setup is performed by PBC (Push Button Configuration).

In this embodiment, the registrar corresponds to the wireless network generating terminal 14, and the enrollee corresponds to each communication terminal, such as the network camera 11, the cellular phone 12, and the laptop 13. In general, in the PBC, the buttons of both the registrar and the enrollee are pushed to set a connection. However, in this embodiment, since the button of the registrar is constantly pushed, the connection setting is continuously in a state of readiness.

In this state, when a setting button of the enrollee is pushed (Step S301), the enrollee notifies the registrar that the setting button has been pushed with sending a probe request (participation request). When receiving the request, the registrar notifies the enrollee that connection setup is available with transmitting a probe response (Step S302). Then, connection setup is started and a shared key is exchanged (Step S303). The registrar performs authentication and allows connection setup for enrollee (Step S304).

Figure 3:
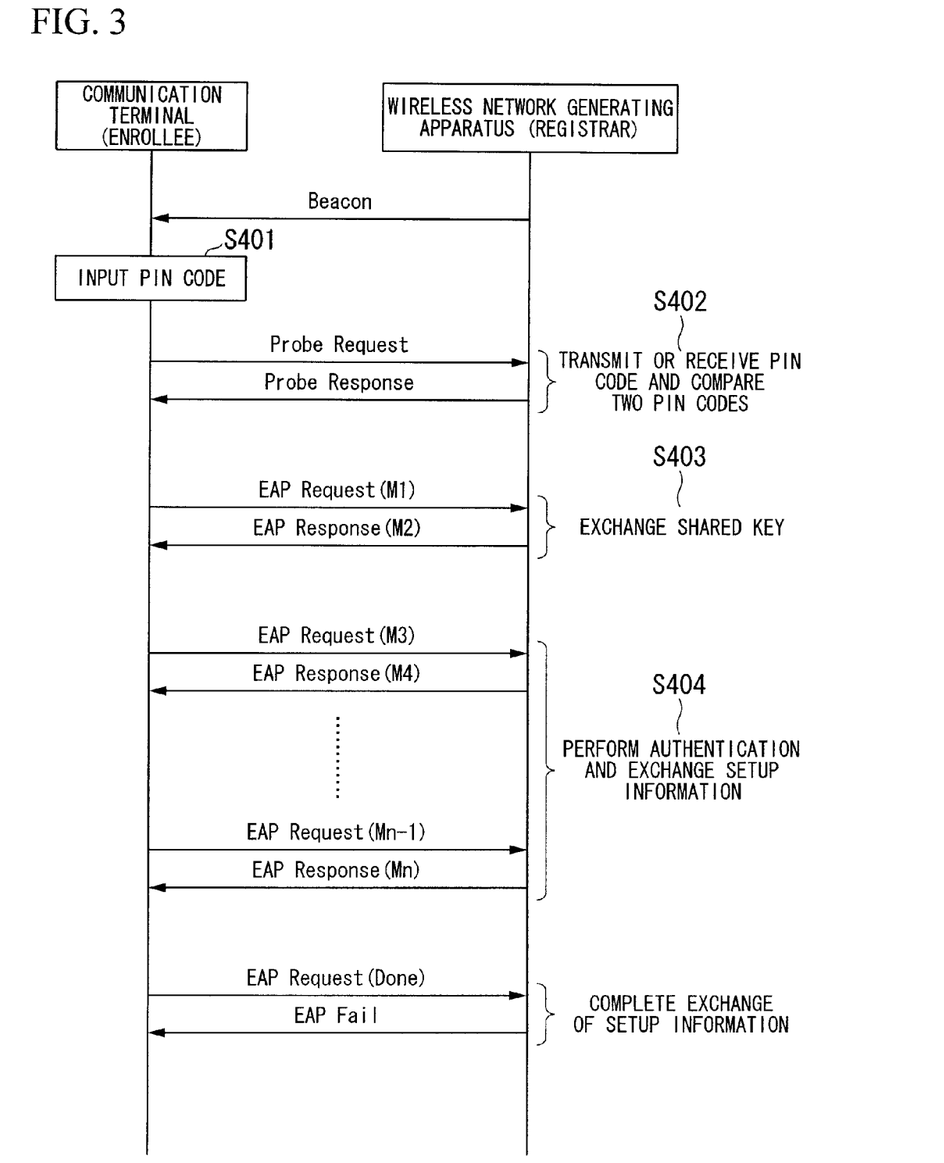
FIG. 3 is a sequence diagram illustrating the connection setup process between the wireless communication terminals according to the first embodiment.

FIG. 3 is a diagram illustrating communication between the registrar and the enrollee when connection setup is performed by the input of a PIN (Personal Identification number) code. In this embodiment, the registrar displays the PIN code, and the user of the enrollee inputs the PIN code to start connection setup (Step S401). When the PIN code is input, the enrollee transmits a probe request including the information of the PIN code to the registrar, thereby requesting connection setup. When receiving the probe request, the registrar checks the PIN code and transmits the check result to the enrollee (Step S402). When a notice indicating that the PIN codes are identical to each other is transmitted, similar to PBC, the shared key is exchanged (Step S403), and the registrar performs authentication and allows connection setup for enrollee (Step S404).

Figure 4:
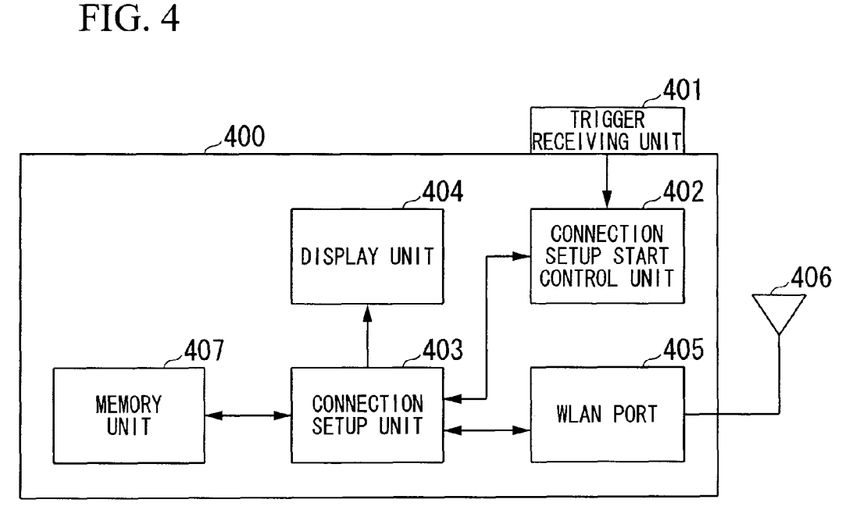
FIG. 4 is a block diagram illustrating the structure of a wireless network generating terminal according to the first embodiment.

FIG. 4 is a diagram illustrating the structure of a wireless network generating terminal 400 according to this embodiment. Next, the structure of the wireless network generating terminal 400 will be described. The wireless network generating terminal 400 includes a trigger receiving unit 401, a connection setup start control unit 402, a connection setup unit 403, a display unit 404, a WLAN port 405, an antenna 406, and a memory unit 407. The wireless network generating terminal 400 corresponds to the wireless network generating terminal 14 shown in FIGS. 1A and 1B, and a display unit 404 corresponds to the LED 14a.

The trigger receiving unit 401 receives a start trigger for generating a new wireless network and an end trigger for ending the generation of a wireless network. The trigger receiving unit 401 may include, for example, a power button for turning power on or off or a dedicated button for inputting the two kinds of triggers.

The connection setup start control unit 402 controls connection setup start timing. The connection setup unit 403 generates wireless network setup information and sets connection to an external terminal through the WLAN port 405 and the antenna 406. The wireless network setup information includes, for example, an SSID, which is an identifier of the wireless network, or a WEP key used for encoding during communication. The display unit 404 displays information indicating that a request to participate in the wireless network is being received. The WLAN port 405 performs communication with an external terminal through the antenna 406. The memory unit 407 stores the generated wireless network setup information.

Next, the operation of the wireless network generating terminal 400 will be described with reference to FIG. 5. When receiving a generation start trigger for starting the generation of a wireless network in the ad hoc mode, which is generated when the wireless network generating terminal 400 starts up, the trigger receiving unit 401 starts the connection setup start control unit 402 in order to start the generation of a wireless network (Step S501). The connection setup start control unit 402 generates an instruction to start connection setup (Step S502). In this way, a connection setup sequence starts.

When receiving the instruction to start connection setup from the connection setup start control unit 402, the connection setup unit 403 generates wireless network setup information (Step S503). A process of generating the wireless network setup information (wireless network setup information generating process) in Step S503 will be described in detail below.

After generating the wireless network setup information, the connection setup unit 403 controls the display unit 404 to display information indicating that the request to participate in the wireless network is being received (Step S504). In this case, in FIGS. 1A and 1B, the LED 14a is turned on to indicate that the request to participate in the wireless network is being received. The display unit 404 is not limited to the LED.

Then, the connection setup unit 403 transmits or receives the wireless network setup information to or from one external terminal through the WLAN port 405 and the antenna 406 (Step S505). A process of transmitting or receiving the wireless network setup information (wireless connection setup process) in Step S505 will be described in detail below.

When the transmission or reception of the wireless network setup information ends, the connection setup sequence ends. In this way, the wireless network generating terminal 400 is separated from the wireless network. As such, the connection setup sequence ends temporarily, but the connection setup start control unit 402 restarts the connection setup sequence using the end of the connection setup sequence as a trigger (Step S506). Alternatively, the connection setup sequence may restart using, for example, a predetermined input from the user or the elapse of a predetermined time from the end of the connection setup sequence as a trigger.

Until the trigger receiving unit 401 receives the end trigger, Steps S505 and S506 are repeatedly performed. When receiving the end trigger (Step S507), the trigger receiving unit 401 notifies the connection setup start control unit 402 that the end trigger has been received. The connection setup start control unit 402 issues an end command for ending the reception of the request to participate in the wireless network to the connection setup unit 403. When receiving the end command, the connection setup unit 403 controls the display unit 404 not to display information indicating the request to participate in the wireless network is being received (Step S508).

Then, the connection setup unit 403 stores the wireless network setup information generated in Step S503 in the memory unit 407 (Step S509). FIG. 6 is a diagram illustrating an example of the content of the stored wireless network setup information. The wireless network setup information is stored such that a setup parameter, such as a WEP key, is associated with an SSID serving as a tag.

After the wireless network setup information is stored, the connection setup start control unit 402 ends the connection setup sequence (Step S510), and the process of generating a wireless network ends. In this way, the wireless network generating terminal 400 is separated from the wireless network. In this case, in FIGS. 1A and 1B, the LED 14a is turned off, and the period for which the request to participate in the wireless network is received ends. Alternatively, the end command may be issued using as a trigger the participation of all external terminals, which are enrollees, in the wireless network, the elapse of a predetermined time from the start of the reception of the participation request, the participation of a predetermined number of external terminals in the wireless network, and the participation of a specific external terminal in the wireless network, for example.

Figure 7:
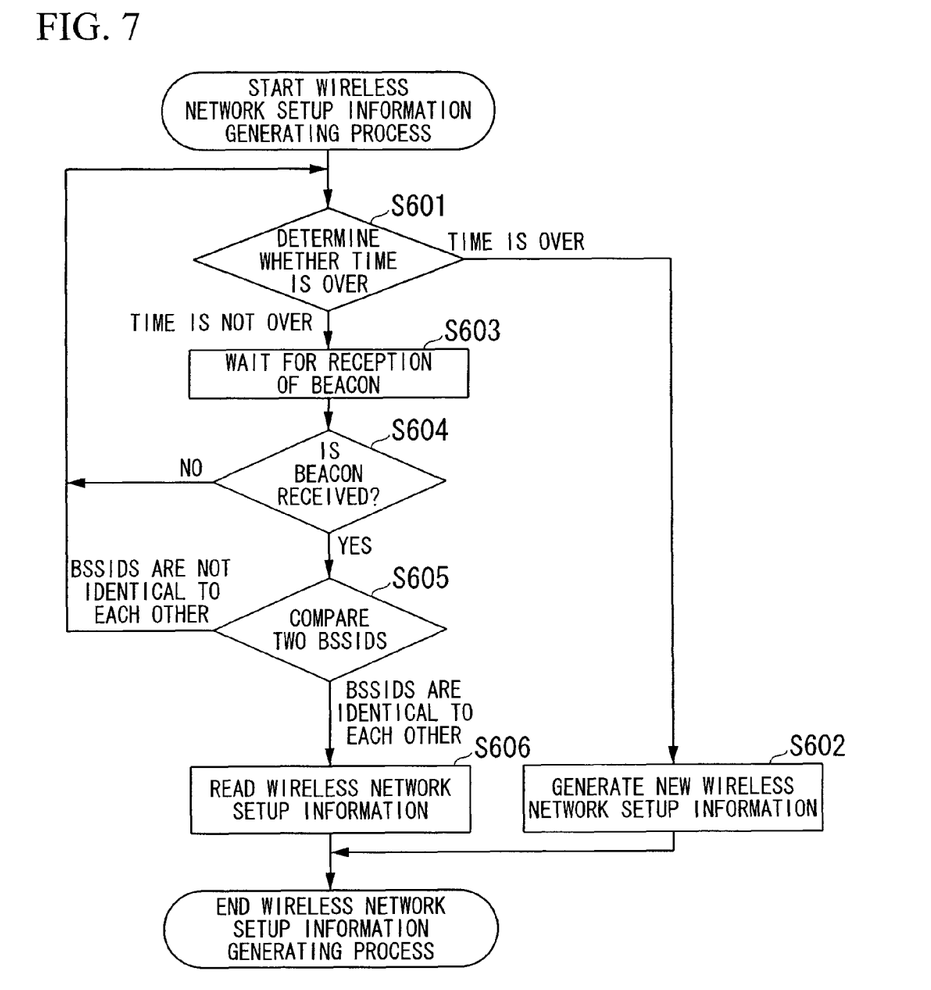
FIG. 7 is a flowchart illustrating the operation of the wireless network generating terminal according to the first embodiment.

FIG. 7 is a flowchart illustrating the details of the wireless network setup information generating process in Step S503. The connection setup unit 403 determines whether or not the time for which the BSSID check process is performed in Step S601 and Steps S603 to S605 exceeds a predetermined time (Step S601). If it is determined that the time exceeds the predetermined time (referred to as timeout), the connection setup unit 403 generates new wireless network setup information (Step S602). On the other hand, if it is determined that the time does not exceed the predetermined time, the connection setup unit 403 is in a standby state for receiving a beacon from an external terminal through the WLAN port 405 and the antenna 406 (Step S603).

The process proceeds to Step S604 using as a trigger the elapse of 1 ms from the reception standby state in Step S603 or the reception of the beacon from the external terminal. In Step S604, it is determined whether Step S604 is triggered by the elapse of 1 ms from the reception standby state or the reception of the beacon from the external terminal. If it is determined that Step S604 is triggered by the elapse of 1 ms, the process returns to Step S601. If it is determined that Step S604 is triggered by the reception of the beacon from the external terminal, the process proceeds to Step S605. In Step S605, the connection setup unit 403 compares the BSSID stored in the beacon received from the external terminal with the BSSID stored in the memory unit 407. When the BSSIDs are identical to each other, the connection setup unit 403 reads information from the memory unit 407 (S606). When the BSSIDs are not identical to each other, the process returns to Step S601. In the process shown in FIG. 7, when there is a previously generated wireless network in the periphery during power-on, the setting thereof is used to generate a wireless network. When there is no previously generated wireless network, a new wireless network with different settings is generated.

Figure 8:
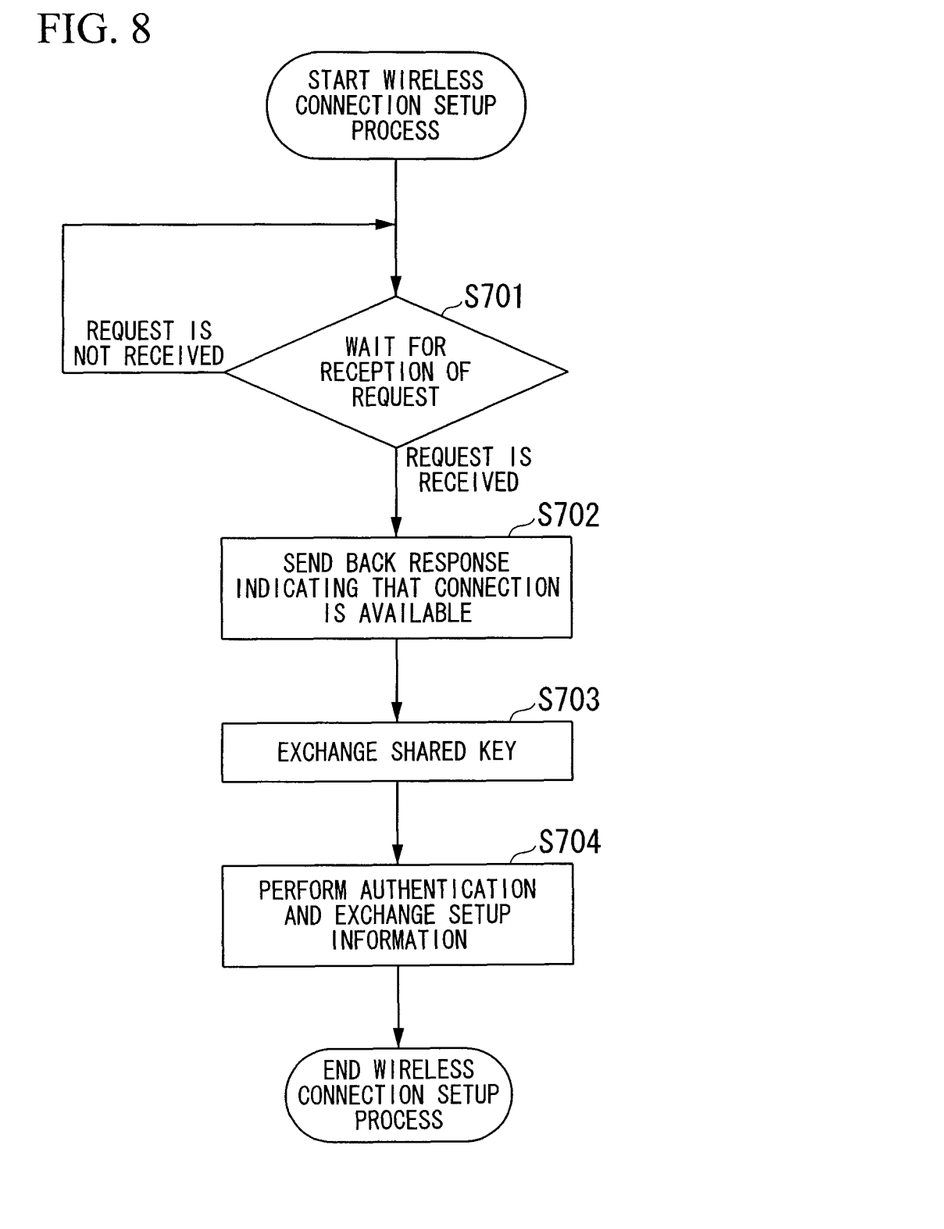
FIG. 8 is a flowchart illustrating the operation of the wireless network generating terminal according to the first embodiment.

FIG. 8 is a diagram illustrating the details of the wireless connection setup process in Step S505. The connection setup unit 403 is in a standby state for receiving the request (probe request) transmitted from an external terminal through the WLAN port 405 and the antenna 406 in the PBC mode (Step S701). In this case, the wireless network generating terminal 400 periodically outputs the beacon through the WLAN port 405 and the antenna 406.

After receiving the request, the connection setup unit 403 sends back a response indicating that a connection is available (Step S702). The reception of the request and the sending-back of the response correspond to Steps S301 and S302 in FIG. 2.

After sending back the response, the connection setup unit 403 exchanges the shared key with one external terminal through the WLAN port 405 and the antenna 406 (Step S703), and performs authentication and the exchange of the wireless network setup information (Step S704). In this way, the wireless connection setup process ends. The exchange of the shared key corresponds to Step S303 in FIG. 2, and the authentication and the exchange of the wireless network setup information correspond to Step S304 in FIG. 2.

As described above, according to this embodiment, the connection setup unit 403 receives the participation requests from a plurality of external terminals through the WLAN port 405 and the antenna 406 based on the generation start trigger received by the trigger receiving unit 401, and performs the connection setup of each external terminal that transmits the participation request to the wireless network. In this way, it is possible to collectively set the connection of a plurality of terminals to the ad hoc network.

As such, it is possible to simply construct a wireless network in the ad hoc mode using the wireless network generating terminal 400. In addition, since the wireless network generating terminal 400 always serves as a registrar, it is possible to prevent an external terminal from participating in an unintended wireless network or an unintended wireless network from being constructed.

Figure 5:
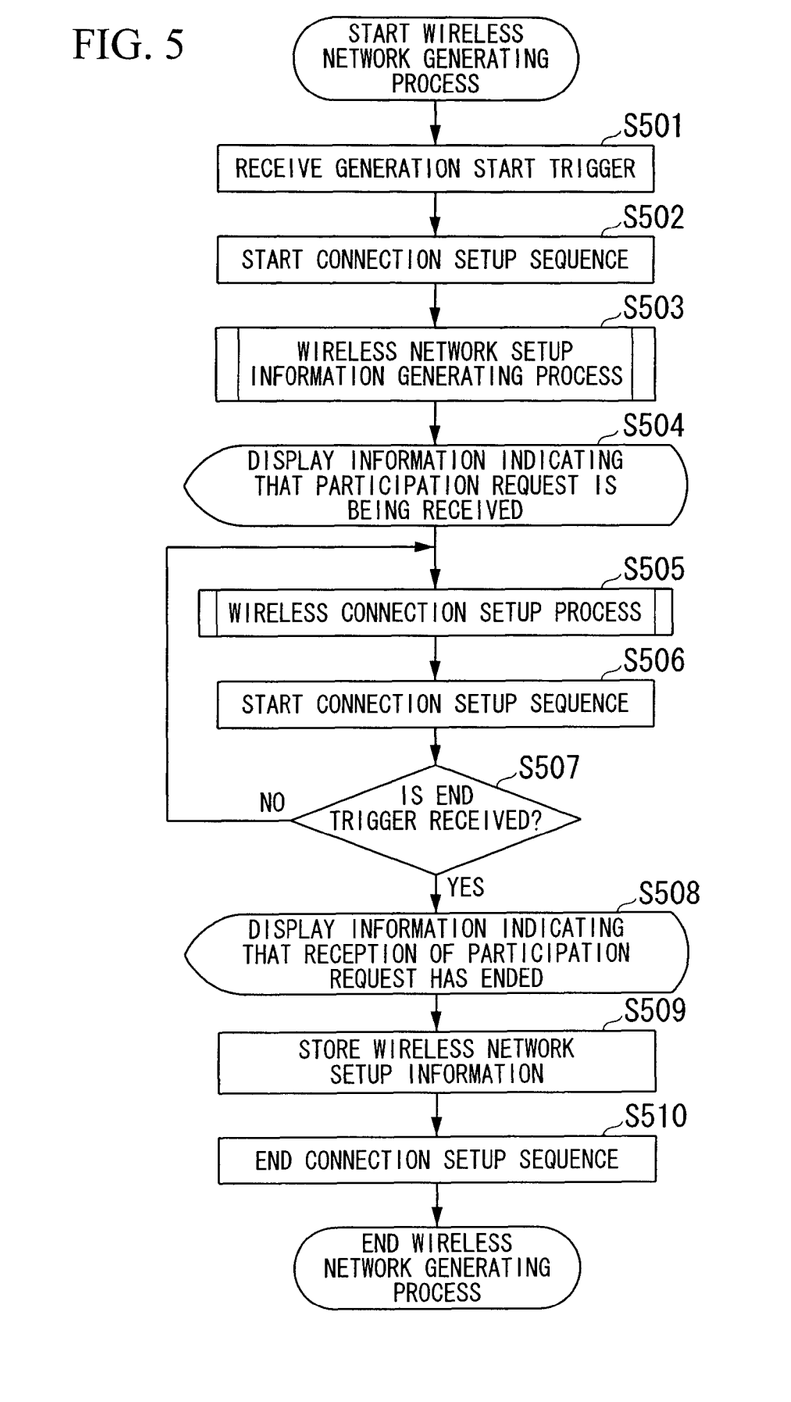
FIG. 5 is a flowchart illustrating the operation of the wireless network generating terminal according to the first embodiment.
Figure 6:
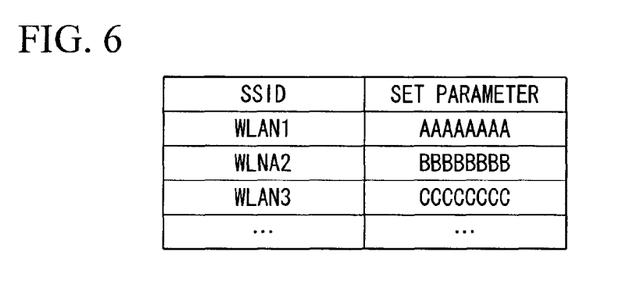
FIG. 6 is a diagram illustrating an example of the memory of wireless network setup information according to the first embodiment.

In the process shown in FIG. 5, in Step S505, the connection setup of the external terminals is sequentially performed in the order in which the participation requests are received from the external terminals. In this way, the external terminal does not need to wait for connection setup for a period that is longer than the necessary amount of time.

In the process shown in FIG. 5, after the connection setup of one of the plurality of external terminals is done in Step S505, the participation request is received from another external terminal in Step S505. In this way, the connection setup of the external terminals is done one by one. Therefore, it is possible to reliably do the connection setup of all the external terminals using a simple method while maintaining the connection method according to the related art.

The generation start trigger for starting the generation of a wireless network is generated in various ways. For example, when the wireless network generating terminal 400 starts in response to the generation start trigger, it is possible to use the wireless network generating terminal 400 even though an input unit for generating a trigger is not provided. When an input unit used by the user to generate the generation start trigger is provided, it is possible to generate a wireless network during the period intended by the user.

Second Embodiment

Next, a second embodiment of the present invention will be described. The structure of a wireless network generating terminal 410 (wireless communication terminal) according to this embodiment is similar to that of the wireless network generating terminal 400 shown in FIG. 4 except for the function of the trigger receiving unit 401, the function of the display unit 404, and the function of the memory unit 407. In the following description, the operation of the wireless network generating terminal 410 will be described using the structure of the wireless network generating terminal 400.

In this embodiment, the trigger receiving unit 401 may generate a switching trigger for switching the setup of a wireless network and a newly generating trigger for generating new wireless network setup information, in addition to the start trigger and the end trigger for starting and ending the generation of a wireless network. The display unit 404 may display information (for example, SSID) for identifying a wireless network and a PIN code, in addition to the information indicating that a request to participate in the wireless network is being received. The memory unit 407 may store the setup content of a plurality of wireless networks.

FIGS. 9A and 9B and FIGS. 10A and 10B are diagrams illustrating examples in which a plurality of wireless networks is constructed in the ad hoc mode using the wireless network generating terminal 410 according to this embodiment. The wireless network generating terminal 410 is operated as a registrar. The wireless network generating terminal 410 includes a display panel 410a that displays information and a control button 410b that controls the start and end of the generation of a wireless network, the generation of a new wireless network, and the switching of the wireless networks.

The request to participate in the wireless network is received only during the period for which information indicating that the request to participate in the wireless network is being received, a PIN code, and the type of wireless network are displayed on the display panel 410a. The display panel 410a corresponds to the display unit 404 shown in FIG. 4, and the control button 410b corresponds to the trigger receiving unit 401.

In this embodiment, laptops 21, 22, 23, 24, 25, 26, and 27 are enrollees. Each of the laptops includes a keyboard, which is an input unit for inputting a PIN code, and a communication circuit for wireless communication with the wireless network generating terminal 410.

Each of the laptops transmits a request to the wireless network generating terminal 410, using as a trigger the input of a PIN code during the period for which information indicating that a request to participate in the wireless network is being received and the PIN code of a desired wireless network are displayed on the display panel 410a of the wireless network generating terminal 410, and receives a response from the wireless network generating terminal 410. In this way, each of the laptops starts connection setup.

Figure 9A:
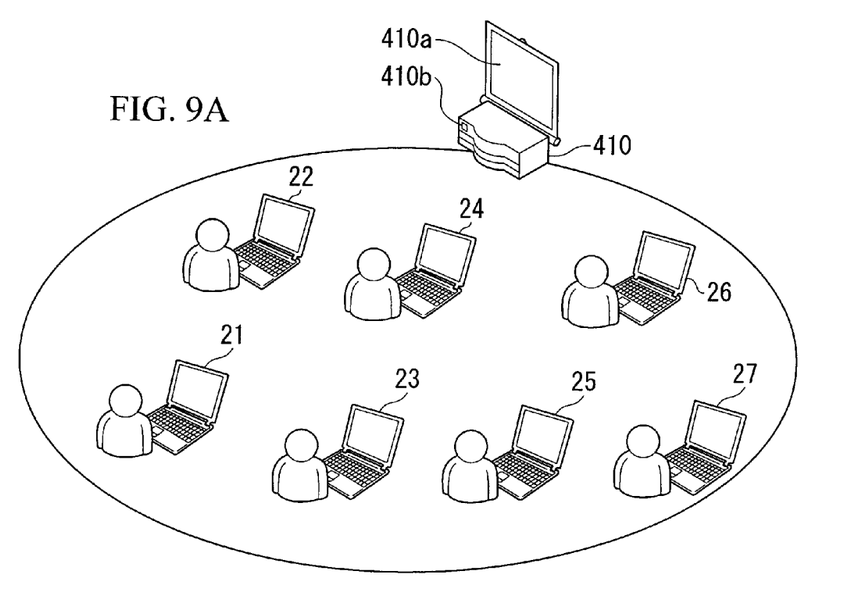
FIGS. 9A and 9B are diagrams illustrating examples in which a wireless communication terminal according to a second embodiment constructs a wireless network.
Figure 9B:
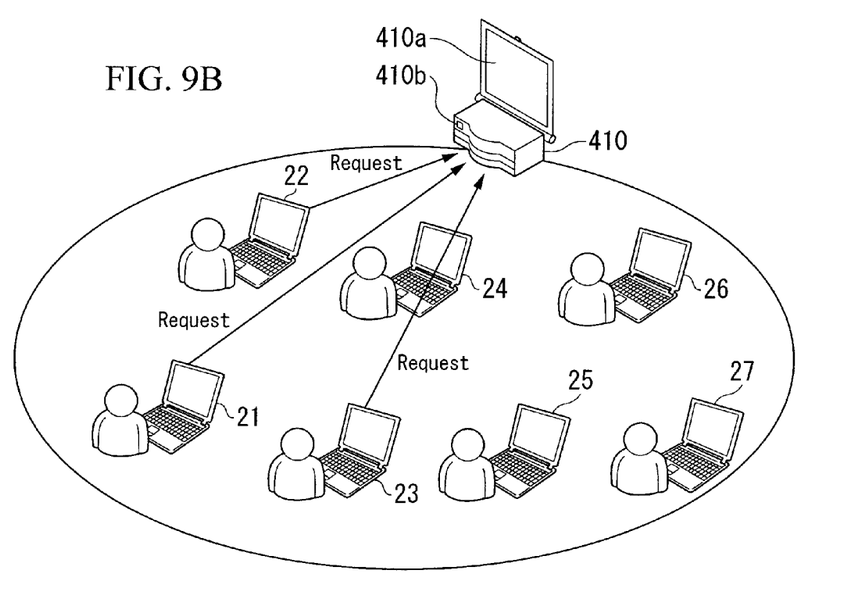

FIG. 9A shows the state in which a wireless network is not generated in a specific area. FIG. 9B shows the state in which the laptops 21, 22, and 23 transmit requests to construct a wireless network in the ad hoc mode. In the example shown in FIG. 9B, connection setup is sequentially performed on the laptops 21, 22, and 23 that have transmitted the requests.

Figure 10A:
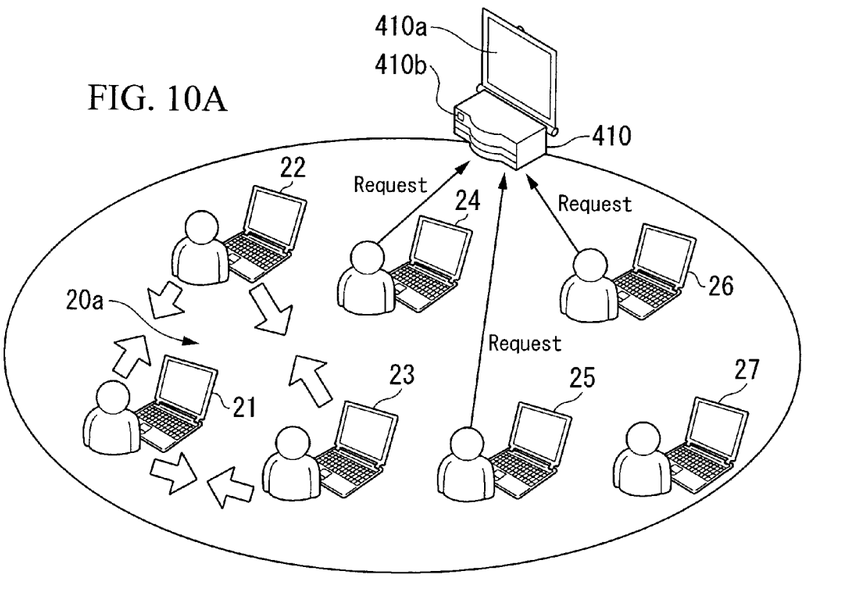
FIGS. 10A and 10B are diagrams illustrating examples in which the wireless communication terminal according to the second embodiment constructs a wireless network.
Figure 10B:
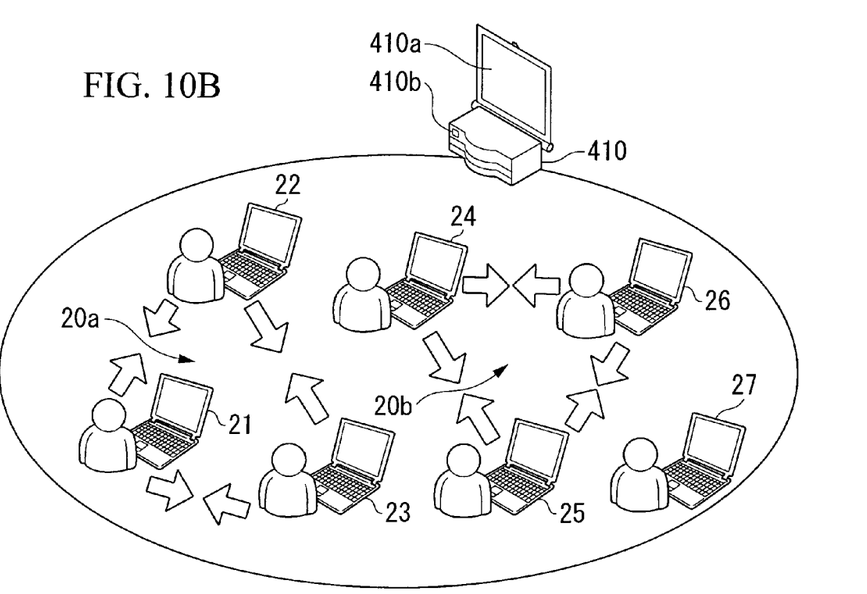

FIG. 10A shows the following. The connection setup of the laptops 21, 22, and 23 is completed, a wireless network 20a is constructed in the ad hoc mode, and the wireless network generating terminal 410 is separated from the network temporarily. Thereafter, the wireless network generating terminal 410 generates new wireless network setup information and displays information indicating that a request to participate in a new wireless network is being received. When the laptops 24, 25, and 26 transmit requests, connection setup is sequentially performed on the laptops. FIG. 10B shows the construction of a new wireless network 20b.

Next, the operation of the wireless network generating terminal 410 will be described with reference to FIG. 11. When receiving the generation start trigger for starting the generation of a wireless network in the ad hoc mode, which is generated when the wireless network generating terminal 410 starts up, the trigger receiving unit 401 starts the connection setup start control unit 402 in order to start the generation of a wireless network (Step S901). The connection setup start control unit 402 generates a command to start connection setup (Step S902). In this way, a connection setup sequence starts.

Immediately after the wireless network generating terminal 410 starts or when the trigger receiving unit 401 receives a newly generating trigger, which will be described below, the connection setup start control unit 402 generates a newly generating command for generating a new wireless network in Step S902. When the trigger receiving unit 401 receives a switching trigger, which will be described below, the connection setup start control unit 402 generates a switching command to switch the wireless networks in Step S902.

The connection setup unit 403 determines the kind of command received from the connection setup start control unit 402 (Step S903). When the switching command is received, the connection setup unit 403 reads the wireless network setup information stored in the memory unit 407 (Step S904). When the newly generating command is received, the connection setup unit 403 generates new wireless network setup information (Step S905).

When receiving the switching trigger, the wireless network generating terminal 410 receives a request to participate in the constructed wireless network again in order to use the wireless network setup information stored in the memory unit 407. When receiving the newly generating trigger, the wireless network generating terminal 410 receives a request to participate in a new wireless network.

After reading or generating the wireless network setup information, the connection setup unit 403 controls the display unit 404 to display information indicating that the request to participate in the wireless network is being received (Step S906). Then, the connection setup unit 403 transmits or receives the wireless network setup information to or from one external terminal through the WLAN port 405 and the antenna 406 (Step S907). A process of transmitting or receiving the wireless network setup information (wireless connection setup process) in Step S907 will be described in detail below.

When the transmission or reception of the wireless network setup information ends, the connection setup sequence ends. In this way, the wireless network generating terminal 410 is separated from the wireless network. As such, the connection setup sequence ends temporarily, but the connection setup start control unit 402 restarts the connection setup sequence using the end of the connection setup sequence as a trigger (Step S908). Alternatively, the connection setup sequence may restart using, for example, a predetermined input from the user or the elapse of a predetermined time from the end of the connection setup sequence as a trigger.

Until the trigger receiving unit 401 receives the switching trigger, the newly generating trigger, or the end trigger, Steps S907 and S908 are repeatedly performed. During the period for which Steps S907 and S908 are performed, the user can input the switching trigger, the newly generating trigger, or the end trigger to the trigger receiving unit 401. The switching trigger is for switching a wireless network to be generated to the constructed wireless network. The newly generating trigger is for generating a new wireless network. The end trigger is for ending the generation of a wireless network.

When receiving the switching trigger, the newly generating trigger, or the end trigger (Step S909), the trigger receiving unit 401 issues an end command for ending the reception of a request to participate in the wireless network to the connection setup unit 403. When receiving the end command, the connection setup unit 403 controls the display unit 404 not to display information indicating that the request to participate in the wireless network is being received and the PIN code (Step S910).

Then, the connection setup unit 403 stores the wireless network setup information read in Step S904 or the wireless network setup information generated in Step S905 in the memory unit 407 (Step S911). Similar to FIG. 6, the wireless network setup information is stored such that a setup parameter, such as a WEP key, is associated with an SSID serving as a tag.

After the wireless network setup information is stored, the connection setup start control unit 402 ends the connection setup sequence (Step S912). In this way, the wireless network generating terminal 410 is separated from the wireless network. After the connection setup sequence ends, the connection setup start control unit 402 determines which trigger is received in Step S909 (Step S913). When the end trigger is received, the wireless network generating process ends. When the newly generating trigger or the switching trigger is received, the process returns to Step S902, and the generation of a wireless network restarts.

The switching of the wireless networks may be performed as follows. For example, when the switching trigger is input, the beacon from the wireless network in the communication range of the wireless network generating terminal 410 is detected, and the BSSID stored in the beacon and the BSSID stored in the memory unit 407 are compared. Then, a list of only the wireless networks having the SSIDs that are identical to those stored in the memory unit is displayed on the display unit 404 such that the user can select a wireless network from the list.

Figure 12:
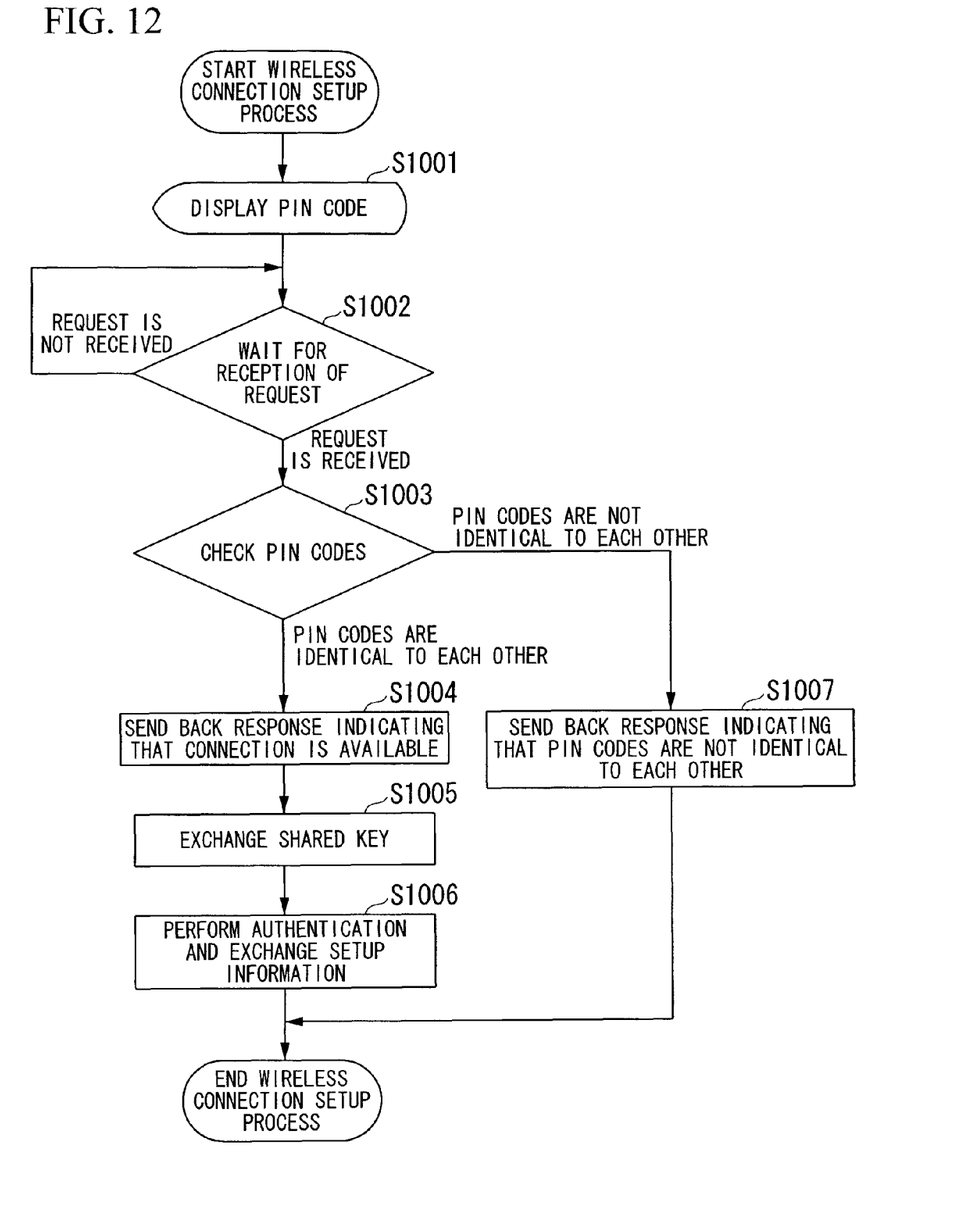
FIG. 12 is a flowchart illustrating the operation of the wireless network generating terminal according to the second embodiment.

FIG. 12 is a diagram illustrating the details of the wireless connection setup process in Step S907. The connection setup unit 403 controls the display unit 404 to display a PIN code for connection to the wireless network (Step S1001). After the PIN code is displayed, the connection setup unit 403 is in a standby state for receiving the request (probe request) transmitted from an external terminal through the WLAN port 405 and the antenna 406 (Step S1002). In this case, the wireless network generating terminal 410 periodically outputs the beacon through the WLAN port 405 and the antenna 406.

After receiving the request, the connection setup unit 403 compares the PIN code appended to the request with the PIN code (the same PIN code as that displayed in Step S1001) of the wireless network generated by the wireless network generating terminal 410 (Step S1003). When the PIN codes are not identical to each other, the connection setup unit 403 sends back a response indicating that the PIN codes are not identical to each other to the external terminal (Step S1007), and the wireless connection setup process ends. On the other hand, when the PIN codes are identical to each other, the connection setup unit 403 sends back a response indicating that connection is available to the external terminal (Step S1004). The reception of the request, the sending-back of the response, and the comparison of the PIN code correspond to Steps S401 and S402 in FIG. 3.

When the PIN code comparison is complete, the connection setup unit 403 exchanges the shared key (Step S1005) and performs authentication and the exchange of the wireless network setup information (Step S1006). In this way, the connection setup process ends. The exchange of the shared key corresponds to Step S403 in FIG. 3, and the authentication and the exchange of the wireless network setup information correspond to Step S404 in FIG. 3.

As described above, according to this embodiment, the connection setup unit 403 receives the participation requests from a plurality of external terminals based on the generation start trigger, the switching trigger, or the newly generating trigger received by the trigger receiving unit 401, and does the connection setup of each external terminal that transmits the participation request to the wireless network. In this way, it is possible to collectively do the connection setup of a plurality of terminals to the ad hoc network.

As such, it is possible to simply construct a plurality of wireless networks in the ad hoc mode using the wireless network generating terminal 410. The wireless network generating terminal 410 can perform switching between the existing wireless network and a new wireless network in response to instructions from the user. In addition, even when any kind of wireless network is generated, the wireless network generating terminal 410 always serves as a registrar. Therefore, it is possible to prevent an unintended wireless network from being constructed and simply construct a desired wireless network.

Figure 11:
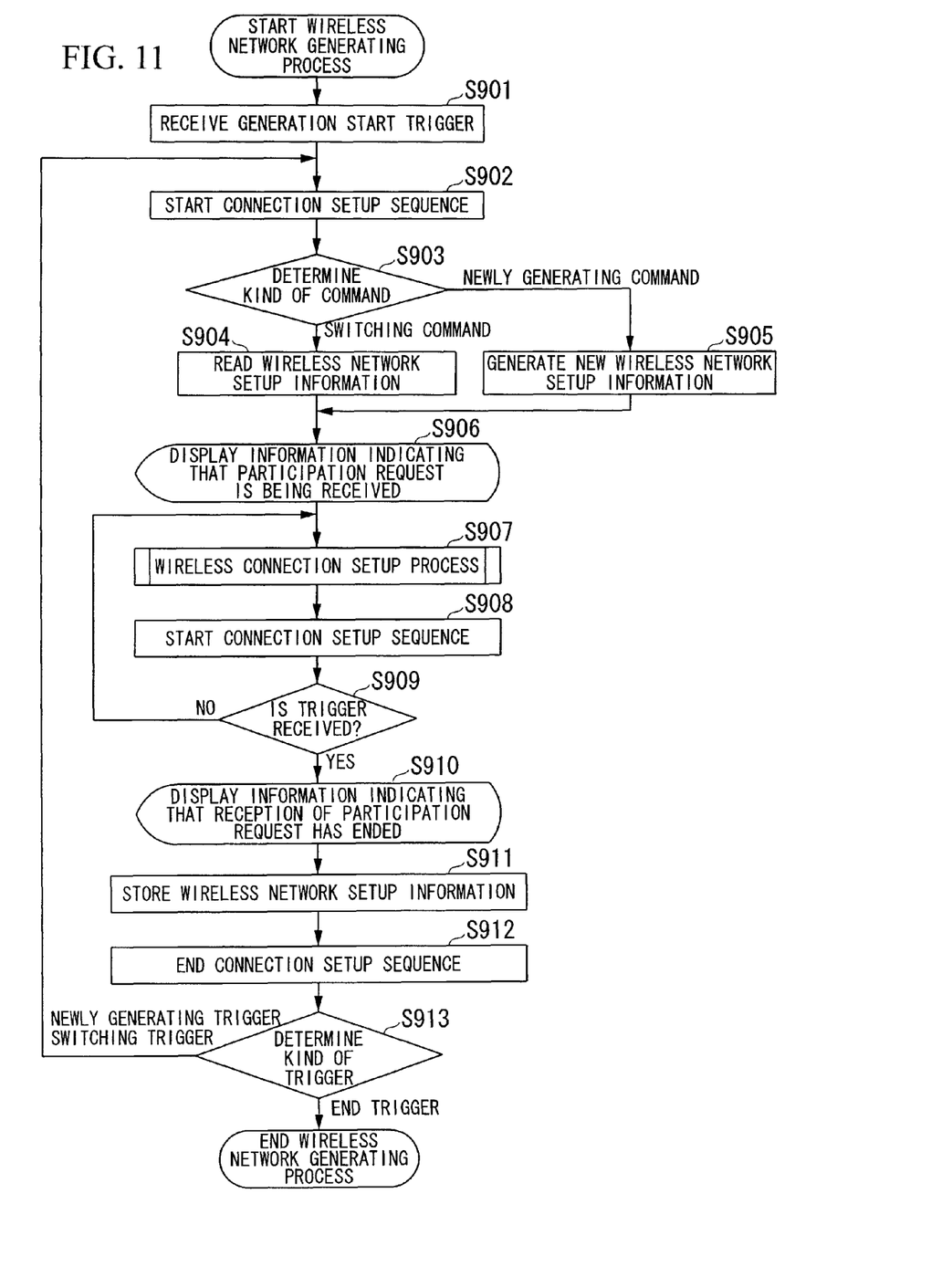
FIG. 11 is a flowchart illustrating the operation of the wireless network generating terminal according to the second embodiment.

In the process shown in FIG. 11, in Step S907, the connection setup of the external terminals is sequentially performed in the order in which the participation requests are received from the external terminals. In this way, the external terminal does not need to wait for connection setup for a period that is longer than the necessary amount of time.

In the process shown in FIG. 11, after the connection setup of one of the plurality of external terminals is done in Step S907, the participation request is received from another external terminal in Step S907. In this way, the connection setup of the external terminals is done one by one. Therefore, it is possible to always do the connection setup of all the external terminals using a simple method while maintaining the connection method according to the related art.

That is, according to the present invention, connection setup is performed in which the participation request received from each of a plurality of external terminals corresponds to one trigger and each of the plurality of external terminals participates in the wireless network in response to the participation request from each external terminal. In this way, it is possible to collectively do the connection setup of a plurality of terminal to the wireless network.

While the exemplary embodiments of the invention have been described with reference to the accompanying drawings, the detailed constitutions of the invention are not limited to the foregoing embodiments but embrace changes in design to the extent that they do not depart from the concept of the invention.

What is claimed is:

1. A wireless communication terminal that communicates in a wireless network comprising:
   a trigger receiving unit configured to receive a generation start trigger, an end trigger, a newly generating trigger, and a switching trigger;
   a connection setup unit configured to:
      transmit, during a period between the trigger receiving unit receiving the generation start trigger and the end trigger, a wireless network setup information sequentially to a plurality of first external terminals that transmit participation requests to the wireless communication terminal in order to establish a first ad-hoc wireless network between the plurality of first external terminals; and
      generate, after the first ad-hoc wireless network is established but before the end trigger is received by the trigger receiving unit, a new wireless network setup information when the newly generating trigger is received by the trigger receiving unit for establishing a second ad-hoc wireless network in response to a new participate request from a second external terminal and for performing a wireless connection setup with the second external terminal;
   a memory unit configured to store the wireless network setup information transmitted to the plurality of external terminals and the new wireless network setup information generated; and
   the connection setup unit further configured to, after the first ad-hoc wireless network is established but before the end trigger is received by the trigger receiving unit, read the wireless network setup information stored in the memory unit when a switching trigger is received by the trigger receiving unit for switching the first ad-hoc wireless network to a third ad-hoc wireless network for establishing the third ad-hoc wireless network in response to a new participate request from a third external terminal and for performing a wireless connection setup with the third external terminal.

2. The wireless communication terminal according to claim 1, further comprising:
   a display unit configured to display a first information, which indicates that the participation requests to participate in the first ad-hoc wireless network that has been displayed are currently being received, when the connection setup unit read the wireless network setup information from the memory unit, or the connection setup unit newly generated the wireless network setup information, the display unit being configured not to display the first information, which indicates that the participation requests to participate in the first ad-hoc wireless network that has been displayed are currently being received, when the trigger receiving unit receives any one of the end trigger, the switching trigger, and the newly generating trigger.

3. The wireless communication terminal according to claim 2,
   wherein the display unit displays at least one of a second information and a PIN code, which is defined as a WPS protocol, that are for distinguishing the wireless network, as the first information indicating that the participation requests to participate in the first ad-hoc wireless network that has been displayed are currently being received.

4. The wireless communication terminal according to claim 3, wherein the display unit displays only a third information to distinguish the wireless network corresponding to a wireless network existing within a communication range from the items of the second information for distinguishing the wireless network.

5. A connection setup method of wireless network, comprising:
   receiving a generation start trigger, a newly generating trigger, an end trigger, and a switching trigger at a trigger receiving unit; and
   transmitting, during a period between the trigger receiving unit receiving the generation start trigger and the end trigger, a wireless network setup information sequentially to a plurality of first external terminals that transmit participation requests to a wireless communication terminal in order to establish a first ad-hoc wireless network between the plurality of first external terminals; and
   generating, after the first ad-hoc wireless network is established but before the end trigger is received by the trigger receiving unit, a new wireless network setup information when the newly generating trigger is received by the trigger receiving unit for establishing a second ad-hoc wireless network in response to a new participate request from a second external terminal and for performing a wireless connection setup with the second external terminal;
   storing in a memory unit the wireless network setup information transmitted to the plurality of external terminals and the new wireless network setup information generated; and
   after the first ad-hoc wireless network is established but before the end trigger is received by the trigger receiving unit, reading the wireless network setup information stored in the memory unit when a switching trigger is received by the trigger receiving unit for switching the first ad-hoc wireless network to a third ad-hoc wireless network for establishing the third ad-hoc wireless network in response to a new participate request from a third external terminal and for performing a wireless connection setup with the third external terminal.

6. The wireless communication terminal according to claim 1, wherein the connection setup unit transmits the wireless network setup information including an encoding key used in communication to the first external terminal.

7. The wireless communication terminal according to claim 1, wherein the trigger receiving unit receives at least one of the newly generating trigger and the switching trigger from a user with an operation button.

* * * * *